US005138358A

United States Patent [19]

Aoyama et al.

[11] Patent Number: 5,138,358

[45] Date of Patent: Aug. 11, 1992

[54] AUTOFOCUSING APPARATUS UTILIZING INTERMITTENT LIGHT PROJECTION

[75] Inventors: Keisuke Aoyama; Akira Ishizaki; Kenji Suzuki, all of Yokohama, Japan

[73] Assignee: Canon Kabushiki Kaisha, Tokyo, Japan

[21] Appl. No.: 789,631

[22] Filed: Nov. 12, 1991

Related U.S. Application Data

[63] Continuation of Ser. No. 463,128, Jan. 10, 1990, abandoned.

[30] Foreign Application Priority Data

Jan. 11, 1989 [JP] Japan ........................................ 1-2835

[51] Int. Cl.[5] ........................................ G03B 3/18

[52] U.S. Cl. ........................................ 354/403; 356/4; 250/201.4

[58] Field of Search ............... 354/403, 404, 405, 406, 354/407, 408, 409, 195.1, 195.12, 195.13, 195.11; 250/201.4; 356/1, 4

[56] References Cited

U.S. PATENT DOCUMENTS 4,678,323 7/1987 Sati et al. ........................... 354/403
4,681,432 7/1987 Kawabata et al. .................. 354/403
4,701,626 10/1987 Ishizaki et al. ................. 358/213.19
4,835,561 5/1989 Matsui ................................ 354/403

FOREIGN PATENT DOCUMENTS 183115 7/1980 Japan .
55-118019 9/1980 Japan .
155331 12/1980 Japan .

*Primary Examiner*—W. B. Perkey
*Assistant Examiner*—Cassandra C. Spyron
*Attorney, Agent, or Firm*—Fitzpatrick, Cella, Harper & Scinto

[57] ABSTRACT

An autofocus apparatus for use with a light projection device which projects light to an object, and a storage sensor which alternately receives light reflected from the object when the light is projected onto the object and when the light is not projected onto the object includes an extraction circuit for extracting from the storage sensor (1) a first sensor output corresponding to when the light is projected onto the object, and (2) a second sensor output corresponding to when the light is not projected onto the object. A setting circuit is provided for setting the sensor in an initial state every time the extraction circuit extracts an output signal from the storage sensor. A control circuit is provided for calculating a difference between the first and second sensor signals and providing an output signal corresponding to the difference.

10 Claims, 8 Drawing Sheets

AUTOFOCUSING APPARATUS UTILIZING INTERMITTENT LIGHT PROJECTION

This application is a continuation of application Ser. No. 07/463,128 filed Jan. 10, 1990, now abandoned.

BACKGROUND OF THE INVENTION

1. Field of the Invention

This invention relates to an automatic focus detection apparatus for performing focus detection using light projected from a light projection means.

2. Background of the Related Art

Heretofore, as a type of focus detection apparatus used for a camera and the like, there has been known an apparatus in which the deviation between two images formed by dividing the exit pupil of a photographing lens is observed by a focus detection optical system to determine the focus state. There has been disclosed, for example, a secondary imaging method in which two secondary optical systems are disposed at an expected focal plane of a photographing lens of a camera, and two images are generated which deviate from each other in accordance with a defocus amount of the photographing lens. The two images are guided to a surface of a photoelectric conversion sensor which detects the relative deviation in image position, as shown in Japanese Patent Public Disclosure (Kokai) Nos. 55-118019 (1980), 55-155331 (1980) and the like.

In automatic focus detection apparatuses having light projection means and using the method described above, focus detection using light projection is limited to when the brightness of an object to be photographed is low and hence contrast is small, such as in darkness and the like. This is because it is impossible to discriminate between external light and the light emitted by the light projection means. When there exists external light more than a certain degree, light projection by the light projection means cannot provide its proper effect.

In consideration of the disadvantage described above, the assignee of the present application has proposed, though not laid open yet, in Japanese patent application No. 63-183115 (filed Jul. 22, 1988) a method capable of solving the above-described disadvantage by using a system in which the emitted light and the external light are discrimiated from each other by time serially modulating a light-emitting source. This method will be briefly explained with reference to FIG. 7.

A light projection circuit 220 emits a pattern light projection (a pattern in which the illuminating light has a spatial distribution of brightness) in response to a transmitted control signal 1. An array SNS of photoelectric conversion devices performs signal storage while removing external light in the following way. Light incident upon photoelectric conversion devices 224 is subjected to photoelectric conversion, and the converted signal is stored in either a storage capacitance device 226 or a storage capacitance device 227 selected by a switch 225 controlled by the control signal 1. The light projection circuit 220 and the switch 225 are operated in synchronization with the control signal 1, and the signal is stored in the storage capacitance device 227 when light is projected and in the storage capacitance device 226 when light is not projected. A differential amplification circuit 228 outputs a signal corresponding to the difference between the storage capacitance devices 226 and 227. The output from the differential amplification circuit 228 is equal to the photoelectrically-converted output when light is projected minus the photoelectrically-converted output when light is not projected, that is, an output in which the external-light component is removed.

An image signal in which an external-light component is removed can be obtained via switches 229 controlled by a control signal 2.

As is apparent from the above description, the above-described application can solve the above-described disadvantage and the like, and hence provides a very effective apparatus. However, since the apparatus includes two storage capacitance devices for each picture element, and uses an amplification circuit for each sensor for outputting the difference between the two capacitance devices, and controls storage by switching between two storage capacitance devices in synchronization with the light projection by the light projection circuit, specific sensors and control circuit are needed.

SUMMARY OF THE INVENTION

It is an object of the present invention to provide an automatic focus detection apparatus or camera capable of performing focus detection and which can function under various photographing conditions by projecting light from light projection means even when there exists external light, without providing a complicated circuit configuration.

According to another aspect of the present invention, an autofocusing apparatus or camera is provided which is capable of performing focus detection without a complicated circuit configuration, by receiving the light reflected from an object when light is projected onto the object by light projection means and the light reflected from the object when light is not projected, alternately upon a storage-type sensor from a state in which the sensor is reset, taking out the sensor outputs when light is projected and when light is not projected independently from each other, and processing a difference between the above-described sensor outputs taken out when light is projected and when light is not projected.

According to another aspect of the present invention, an autofocus apparatus for use with a light projection device which projects light to an object, and a storage sensor which alternately receives light reflected from the object and when the light is not projected onto the object includes an extraction circuit for extracting from the storage sensor (1) a first sensor output corresponding to when the light is projected onto the object, and (2) a second sensor output corresponding to when the light is not projected onto the object. A setting circuit is provided for setting the sensor in an initial state every time the extraction circuit extracts an output signal from the storage sensor, to cause the sensor to receive light in the initial state. Finally, a control circuit is provided for calculating a difference between the first and second sensor signals and providing an output signal corresponding to the difference.

According to a further aspect of the present invention, an autofocus apparatus for use with a light projection device which projects light to an object, and a storage sensor which alternately receives light reflected from the object when the light is projected onto the object and when the light is not projected onto the object includes an extraction circuit for independently extracting from the storage sensor (1) a first sensor output corresponding to a time when the light is projected onto the object, and (2) a second sensor output corresponding to a time when the light is not projected onto the object. A setting circuit is provided for setting the sensor to an initial state each time the extraction circuit extracts a sensor output from the sensor. A first arithmetic is included for calculating (1) a first difference between the first and second sensor outputs during an initial light-receiving sequence, and (2) a second difference between the first and second sensor outputs during a subsequent light-receiving sequence. A second arithmetic circuit is provided for adding the first and second differences, and a control circuit provides an output signal corresponding to the added first and second differences.

These and other objects of the present invention will become more apparent from the following preferred embodiments described in reference to the accompanying drawings.

DESCRIPTION OF THE PREFERRED EMBODIMENTS

Figure 1:
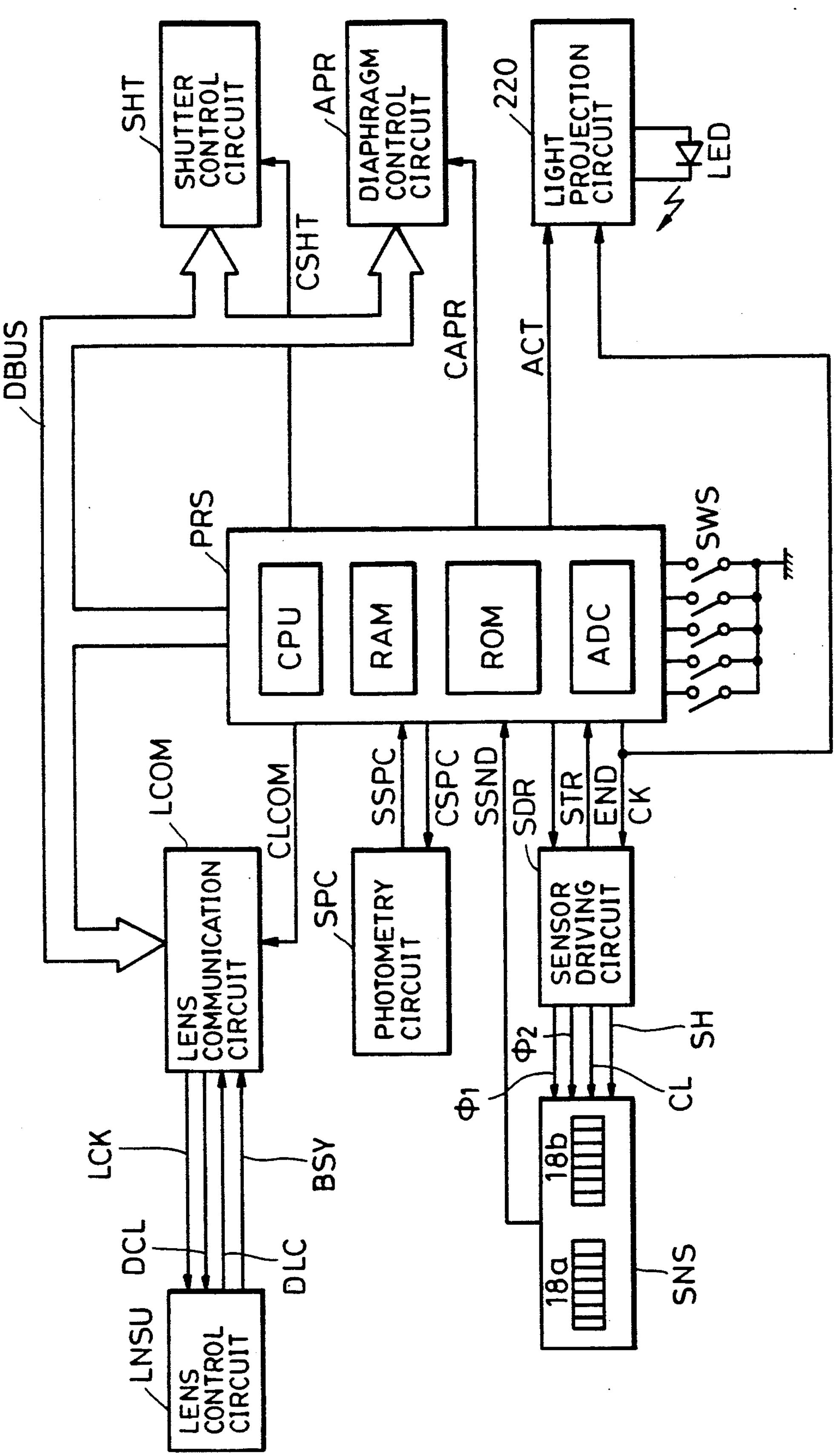
FIG. 1 is a block diagram showing a first embodiment of the present invention.

The present invention will now be explained in detail according to the preferred embodiments shown in the drawings.

First, an outline of each embodiment to be described below will be explained with reference to FIG. 4.

FIG. 4(*a*) is a diagram showing a sensor output when a pattern is projected by light projection means. When storage in a sensor is performed while projecting a light pattern, the added amount of the projected pattern and external light becomes an image signal. The image signal is stored in a microcomputer.

FIG. 4(*b*) is a diagram of a sensor output when storage is performed without projecting a pattern by light projection means. Since no pattern is projected, the sensor output corresponds only to external light. An image signal made of only external light is also stored in the microcomputer.

FIG. 4(*c*) shows a difference between the image signals of FIG. 4(*a*) and FIG. 4(*b*). The calculation of the difference is performed in the microcomputer.

FIG. 4(*d*) shows a case in which, since sufficient data for performing automatic focus detection cannot be obtained at one storage operation, the difference calculation is repeated several times and the results are added together to provide a sufficient output.

FIG. 1 is a block diagram showing an embodiment of the present invention applied to a camera.

A central arithmetic circuit PRS of the camera comprises, for example, a one-chip microcomputer in which a CPU, a RAM, a ROM, an ADC (A/D converter), an input port and the like are disposed. Within the ROM, a series of software and parameters for controlling the camera are stored. There is also shown a data bus DBUS. A shutter control circuit SHT receives data input via the data bus DBUS while a control signal CSHT is being input from the central arithmetic circuit PRS, and performs running control of first and second screens of a shutter (not illustrated) according to the data. A diaphragm control circuit APR receives data input via the data bus DBUS while a control signal CAPR is being input, and controls a diaphragm control mechanism (not illustrated) according to the data. Switches SWS comprise, though not illustrated, a release switch, a successive-photographing-mode switch, switches for setting various kinds of information, and the like.

A lens communication circuit LCOM receives data input via the data bus DBUS while a control signal CLCOM is being input, and performs serial communication with a lens control circuit LNSU according to the data. It also transmits data DCL for lens driving to the lens control circuit LNSU in synchronization with a clock signal LCK, and simultaneously receives serial input of lens information DLC. A signal BSY notifies the camera side of the fact that a lens for focus adjustment (not illustrated) is moving. The above-described serial communication is not performed while this signal is being generated. A photometry circuit SPC outputs a photometry output SSPC to the PRS when it receives a control signal CSPC from the central arithmetic circuit PRS (termed hereinafter simply PRS in the embodiment). The photometry output SSPC is subjected to A/D conversion in an ADC (A/D converter) within the PRS, and the converted data are used as data for controlling the above-described shutter control circuit SHT and diaphragm control circuit APR. A sensor driving circuit SDR controls a line sensor SNS, which includes sensor units 18*a* and 18*b*, in accordance with each signal input from the PRS. The sensor units 18*a* and 18*b* are controlled by control signals $\phi_1$, $\phi_2$, CL and SH from the sensor driving circuit SDR. A light projection circuit 220 drives a light emitting device LED according to a control signal ACT and a synchronizing clock signal CK received from the PRS to emit light.

Figure 2:
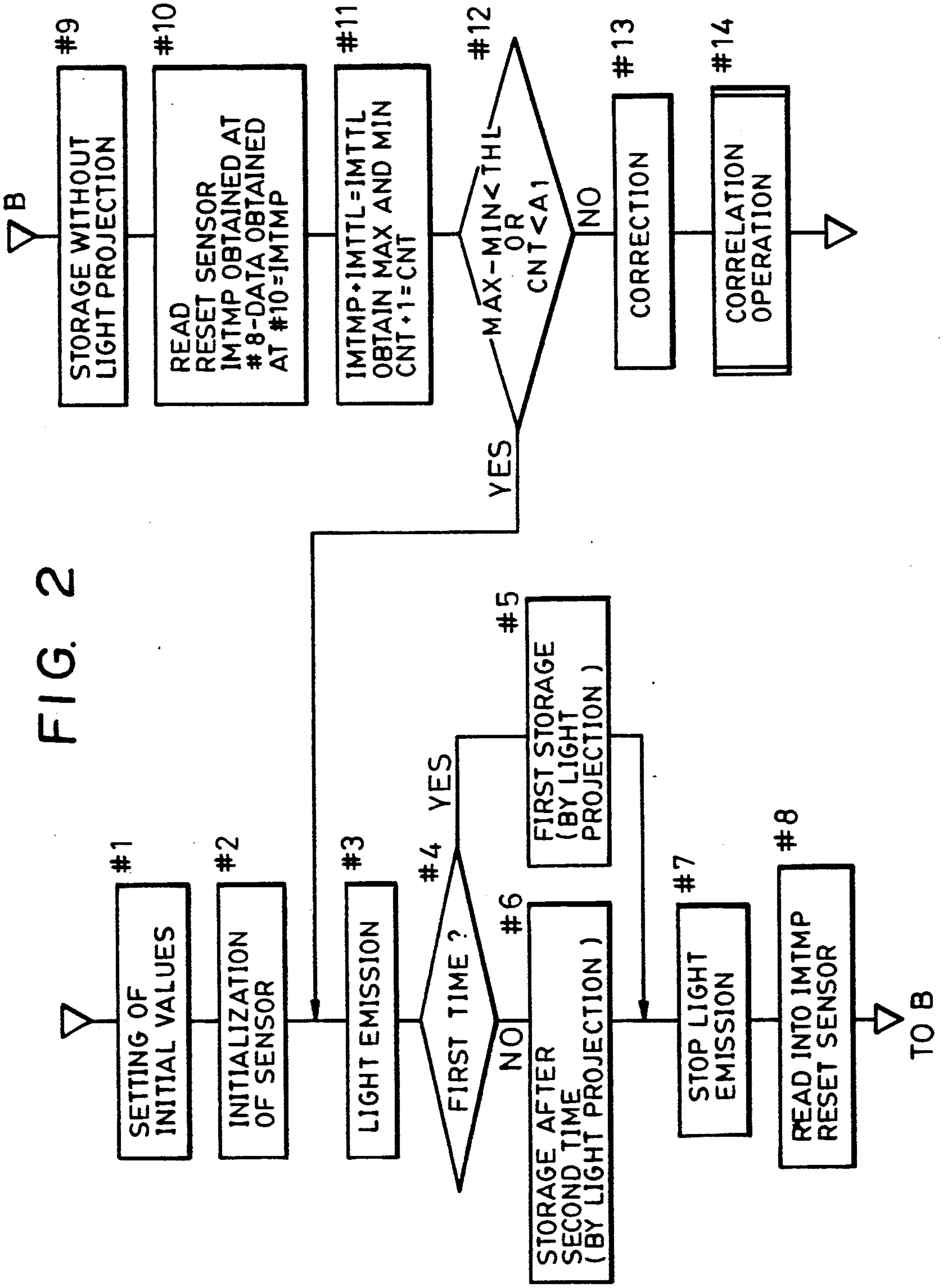
FIG. 2 is a flowchart showing the operation of the FIG. 1 embodiment.

FIG. 2 is a flowchart showing the operation of the first embodiment of the present invention. The operation will be explained with reference to FIG. 1.

[Step 1] A counter CNT for counting the number of synchronized storage operations, an INTT storage area for storing the storage time of the sensor (the line sensor SNS), a GAIN storage area for storing the amplification factor of the sensor, a RAM area IMTMP for storing one image data output from the sensor, and a RAM area IMTTL for calculating the sum of sensor outputs are all cleared. Initial setting of the maximum value MAX and the minimum value MIN of stored data is also performed.

[Step 2] The sensor is initialized.

[Step 3] The control signal ACT is communicated to the light projection circuit 220 to have the light emitting device LED emit light.

[Step 4] It is determined whether or not the storage is the first storage operation according to the value of the counter for the number of storage operations. If the storage is the first storage operation, the process proceeds to step 5. If not, the process branches to step 6.

[Step 5] Storage in the sensor is performed. As for the storage time and amplification factor, the sensor driving circuit SDR performs the following control operations.

Figure 3:
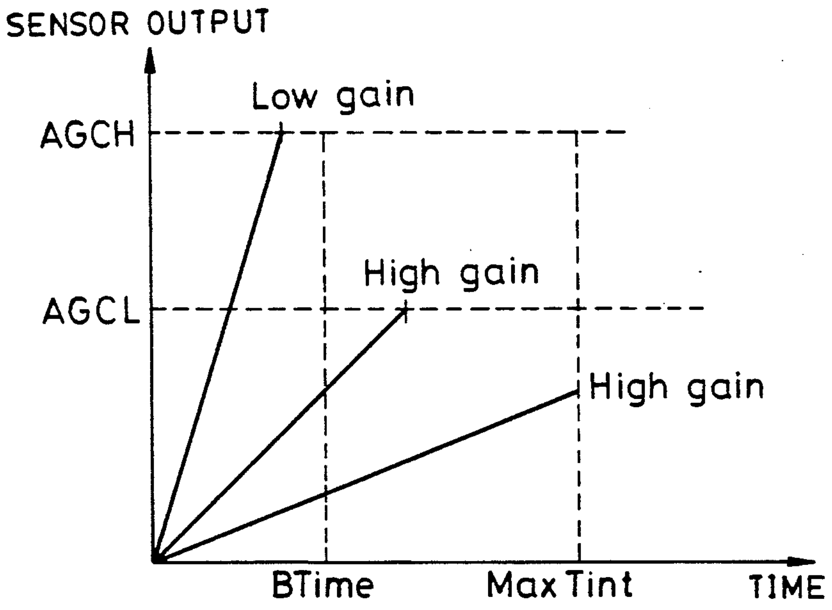
FIG. 3 is a diagram for explaining the control of the storage in a sensor.
Figure 4A:
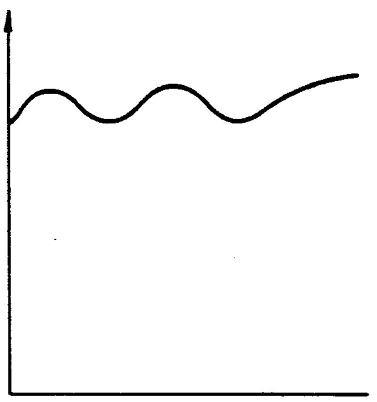
FIGS. 4(*a*)–4(*d*) are diagrams for explaining output states in the signal processing processes.
Figure 4B:
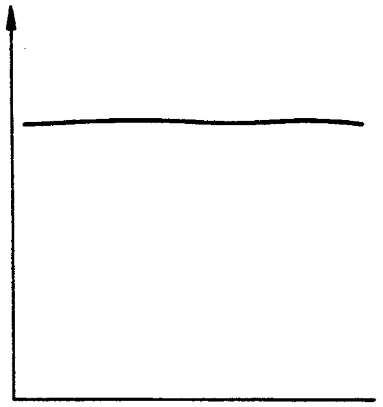
Figure 4C:
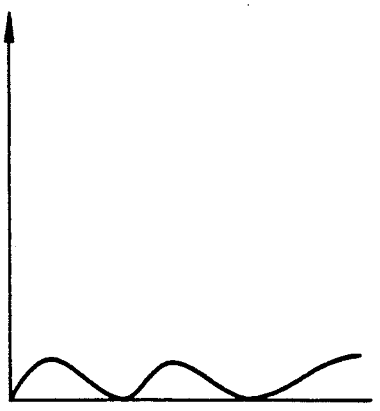
Figure 4D:
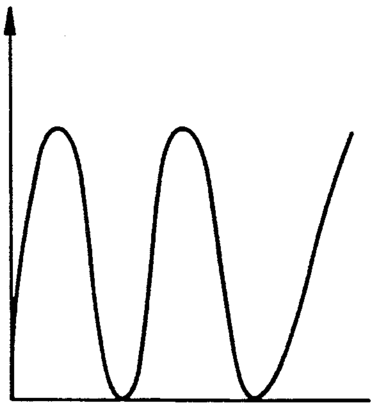
Figure 8:
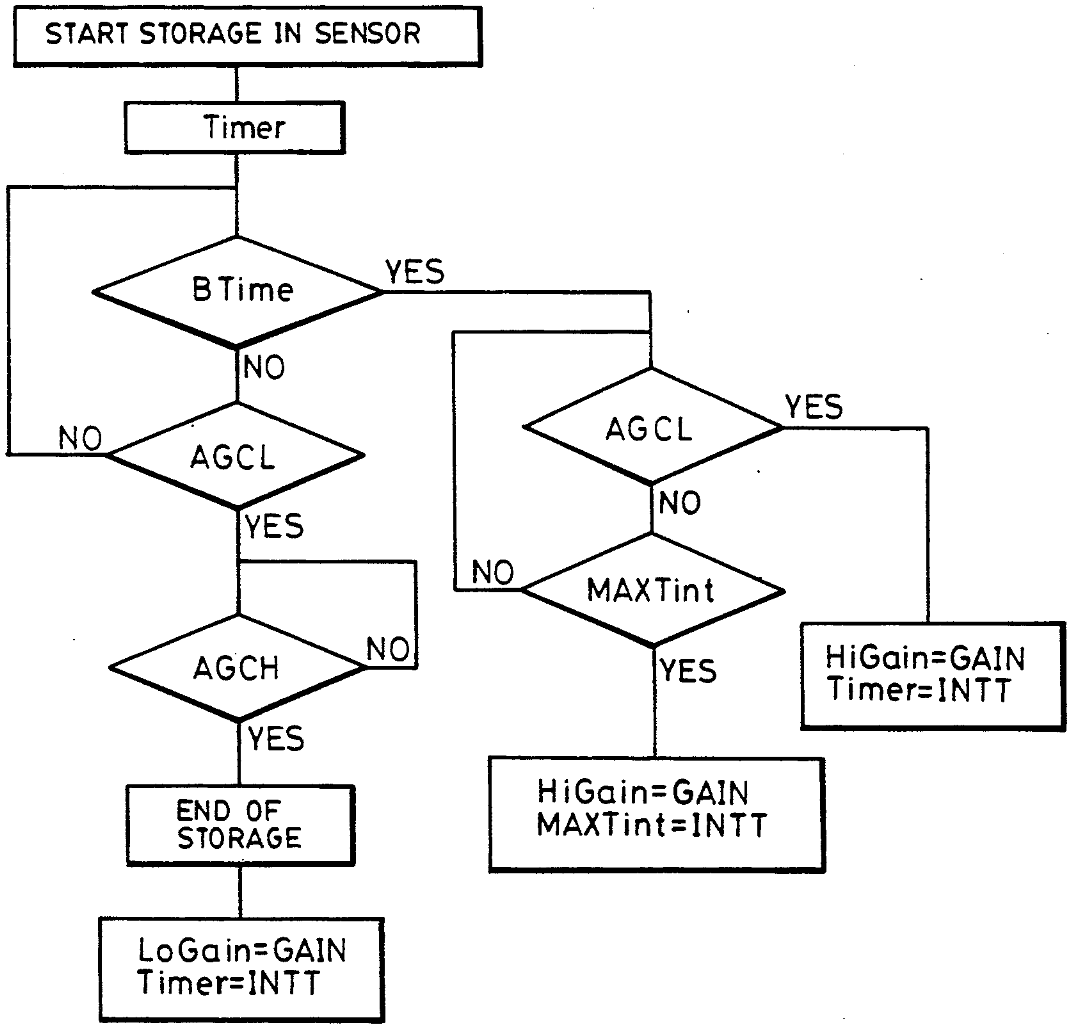
FIG. 8 is a flowchart showing step 5 in the flowchart of FIG. 2.

First, storage in the sensor is performed for B Time, and the amplification factor and storage time are controlled by the sensor output at that time. If the sensor output (the output of a picture element having the maximum value among the outputs of respective picture elements constituting the sensor) reaches the level of AGCL (see FIG. 3) before the storage time exceeds B Time, the sensor performs storage until the sensor output reaches AGCH, and the amplification factor of the sensor at the moment of reading is set to a low amplification factor. If the sensor output does not reach AGCL when the storage time is at B Time, storage is performed until the sensor output reaches AGCL, and the amplification factor of the sensor at the moment of reading is set to a high amplification factor (see FIG. 3). When the storage time reaches MAX Tint, storage is terminated even if the output does not reach AGCL. Also in this case, a high amplification factor is set. The storage time and amplification factor thus controlled are stored in the above-described INTT AND GAIN storage areas, respectively. The flow of the above-described operation in step 5 is shown in FIG. 8.

[Step 6] Storage is performed with the storage time (INTT) and amplification factor (GAIN) set at the first storage operation (step 5).

[Step 7] After the storage has been terminated, the control signal ACT for the light projection circuit 220 is stopped to terminate light emission.

[Step 8] Data stored in the sensor are sequentially read in the RAM area IMTMP while performing A/D conversion using the ADC within the PRS. Electric charges stored in the sensor are reset at this time.

[Step 9] Storage in the sensor when no light is emitted is performed. Similar to step 6, storage is performed with the storage time and amplification factor set at the first storage operation.

The value of INTT for storing the storage time of the sensor is not necessarily identical to the value when light is emitted. The storage time may, for example, be set to half that when light is emitted to shorten processing time, and data may be corrected to cover the shortage.

[Step 10] Data stored within the sensor are sequentially read while performing A/D conversion using the ADC within the PRS. The result obtained by subtracting the data read at step 10 from the IMTMP data read at step 8 is stored again in the IMTMP RAM area. Electric charges stored in the sensor are reset. The subtraction of the data read at step 10 from the IMTMP data read at step 8 is performed for each identical picture element of the sensor.

[Step 11] The IMTMP data and IMTTL data obtained at step 10 are added together for each identical picture-element, and the result is input to the IMTTL storage area. The maximum output MAX and the minimum output MIN among respective picture-element outputs of the added IMTTL data are then obtained.

[Step 12] A check for the end of the number of storage operations is performed. If (MAX−MIN) is within a threshold level THL which has been set, the process returns to step 3, where storage is once again performed. If the calculated (MAX−MIN) exceeds the threshold level THL, or the number of storage operations CNT reaches the maximum number $A_1$ of storage operations which has been set, the process proceeds to step 13.

It is also possible to change the storage time for the next time and the like according to the value of (MAX−MIN). That is, in a case in which the above-described (MAX−MIN) obviously exceeds the threshold level THL if one subsequent storage operation is performed for the time set at step 5, a storage time equal to half the time may, for example, be set and the routine from step 3 may be executed, and the like.

[Step 13] After the repeated storage operations have been terminated, correction calculation of image data (the IMTTL data) is performed.

This operation relates to correction for unevenness in the amount of light due to the optical system and unevenness in the sensitivity of the sensor, and is performed for each picture element of the sensor in the following way:

$$I(i) \times sh(i) + dk(i),$$

where I(i): sensor output, and sh(i), dk(i): amount of correction. This operation is usually performed at the moment of reading the sensor output. When storage is repeated N times, the final output of synchronized storage becomes:

$$\Sigma[\{IL(n,i) \times sh(i) + dk(i)\} - \{IN(n,i) \times sh(i) + dk(i)\}],$$

where IL(n, i) is the output of the n-th storage operation of the i-th picture element when light is emitted, and IN(n, i) is the output of the n-th storage operation of the i-th picture element when light is not emitted.

By transforming the above-described formula, we obtain:

$$\Sigma[IN(n,i) - IN(n,i)] \times sh(i).$$

As described above, the operation is performed N times when it is performed at the moment of reading the sensor output. As can be understood from the above formula, however, the correction operation may be performed at the final stage, and such a method has the advantages that the time for focus detection can be shortened and errors accompanying the operation can also be reduced.

[Step 14] A known correlation operation for focus detection is performed.

Figure 5:
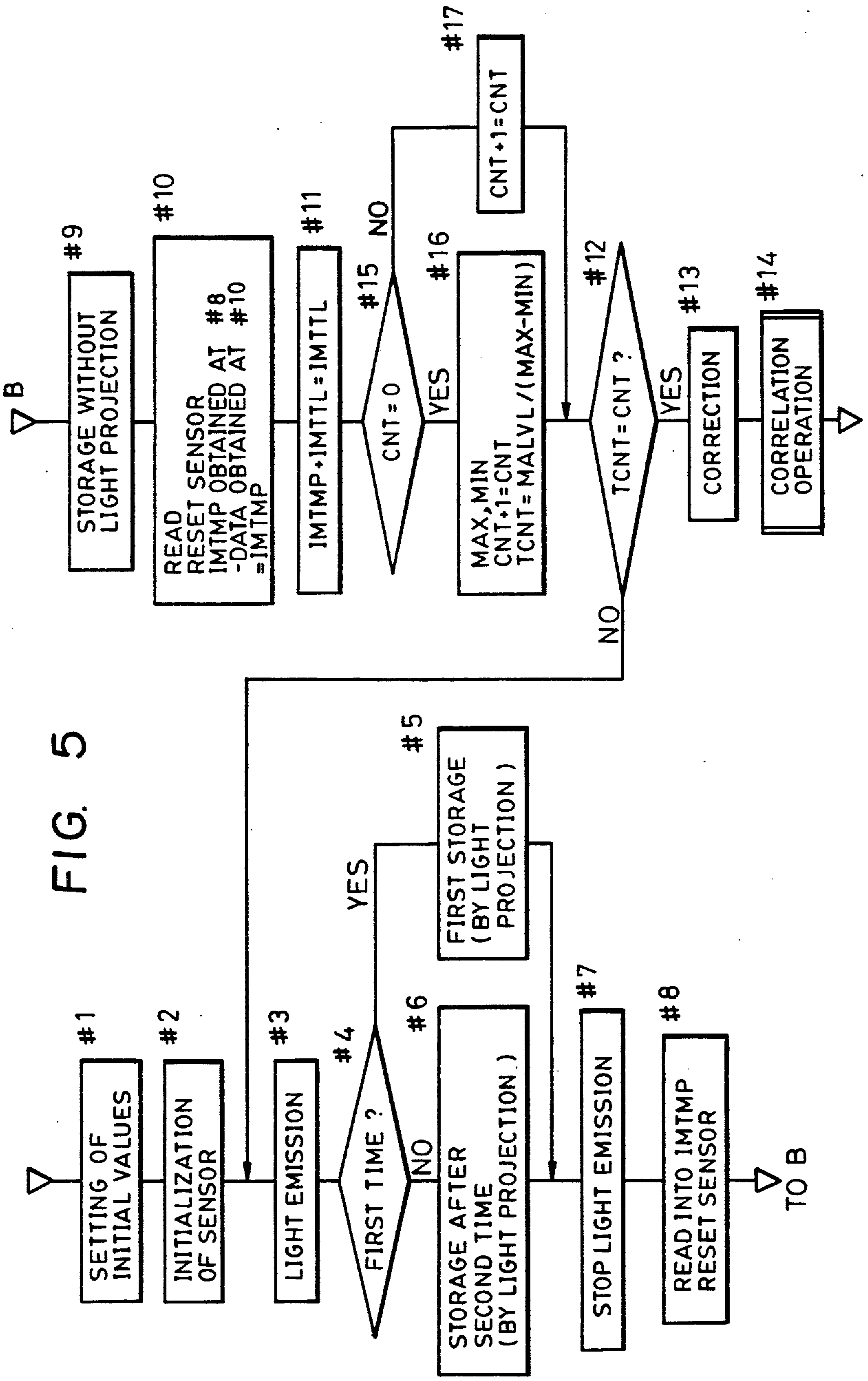
FIG. 5 is a flowchart showing an operation of a second embodiment of the present invention.

FIG. 5 is a flowchart showing the operation of a second embodiment of the present invention. In FIG. 5, portions identical to those in FIG. 1 are indicated by like numerals. The circuit configuration is identical.

[Step 1] The counter CNT for counting the number of synchronized storage operations is initialized. The INTT storage area for storing the storage time of the sensor, the GAIN storage area for storing the amplification factor of the sensor, the RAM area IMTMP for storing one image data output from the sensor and the RAM area IMTTL for calculating the sum of sensor outputs are all cleared.

The process is identical to that of the FIG. 2 embodiment from step 2 to step 10, where storage in the sensor when light is emitted and when light is not emitted and data read operations are performed.

[Step 11] Data for one synchronized storage operation are added to the sum up to the preceding storage operation.

[Step 15] It is determined whether or not the storage is the first storage operation by the value of the counter CNT for the number of storage operations. If the storage is the first storage operation, the process branches to step 16. If not, the process branches to step 17.

[Step 16] The maximum value MAX and the minimum value MIN among the outputs of respective picture elements at the first storage operation are obtained. The final number of storage operations is calculated from the difference (MAX−MIN) between the maximum value and the minimum value.

$$TCNT=MALVL\div(MAX-MIN)$$

is calculated, where TCNT is the number of storage operations, which is not set to a value larger than a preset number of storage operations, and MALVL=a constant value.

The storage time (INTT) for the sensor from the next storage operation and the amplification factor (GAIN) of the sensor may be reset at this time.

[Step 17] After the second storage operation, the counter CNT for counting the current number of storage operations is counted up.

[Step 12] A check for the end of the number of storage operations is performed. Since the number of storage operations has been calculated at step 16 and the current number of storage operations is known by step 17, the two numbers are compared with each other. If they are not equal, the process returns to step 3, where storage is performed again.

Steps 13 and 14 are identical to those in the FIG. 2 embodiment, where correction and correlation operations are performed.

In the FIG. 5 embodiment, it is not necessary to calculate the maximum value and the minimum value for every storage operation, unlike in the FIG. 2 embodiment. That is, since a method is adopted in which the number of storage operations is set according to the result of the first storage operation, it is not necessary to perform the calculation of whether or not (MAX−-MIN) exceeds the threshold level THL for every termination of a storage operation. Accordingly, although there are cases in which accuracy is somewhat lower than that in the FIG. 2 embodiment (for example, a case in which the brightness of a field suddenly changes at the moment of shutter release), the present embodiment has the effect that the program for storage control becomes simple and the time for focus detection is shortened.

Figure 6:
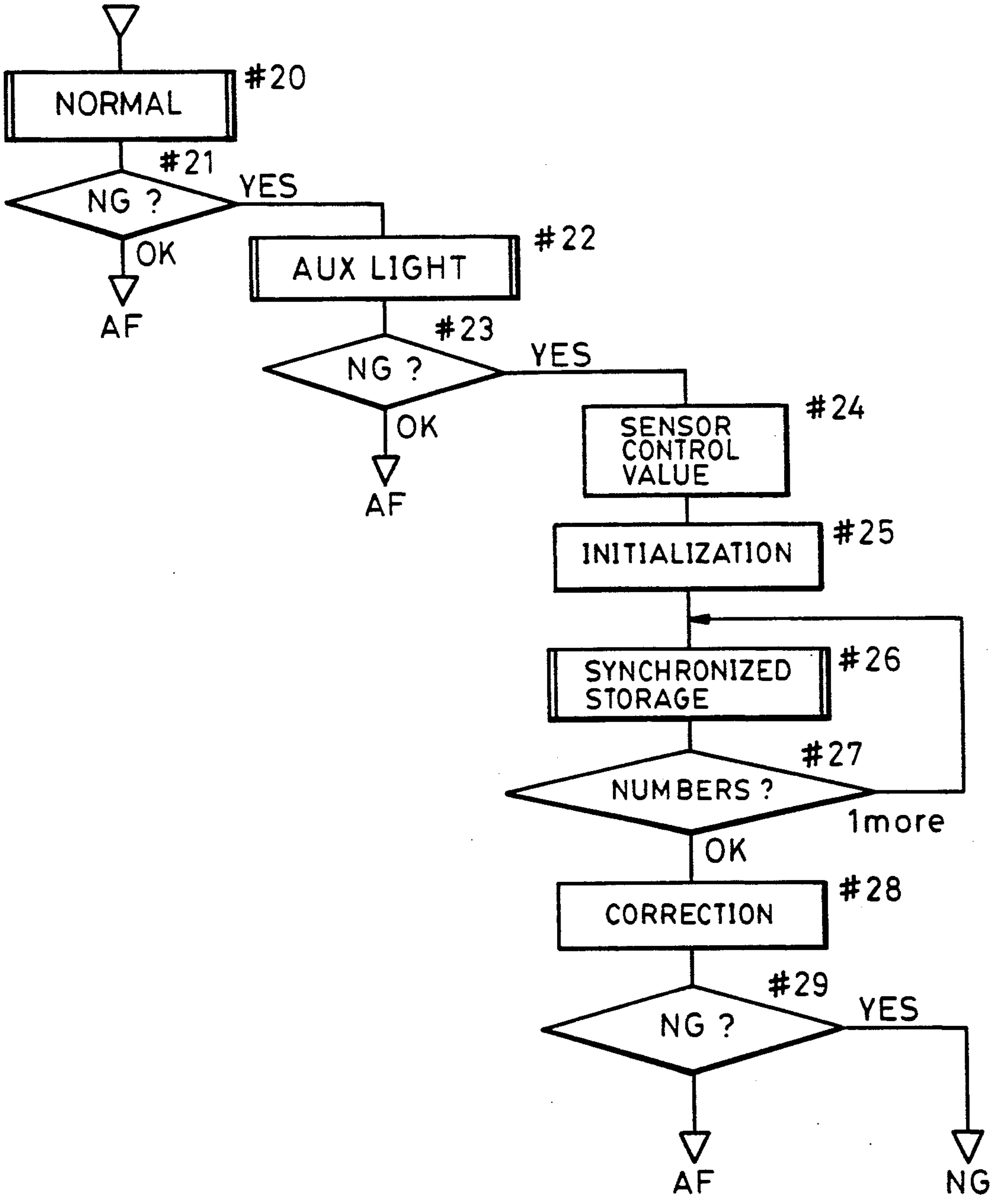
FIG. 6 is a flowchart showing a third embodiment of the present invention.
Figure 7:
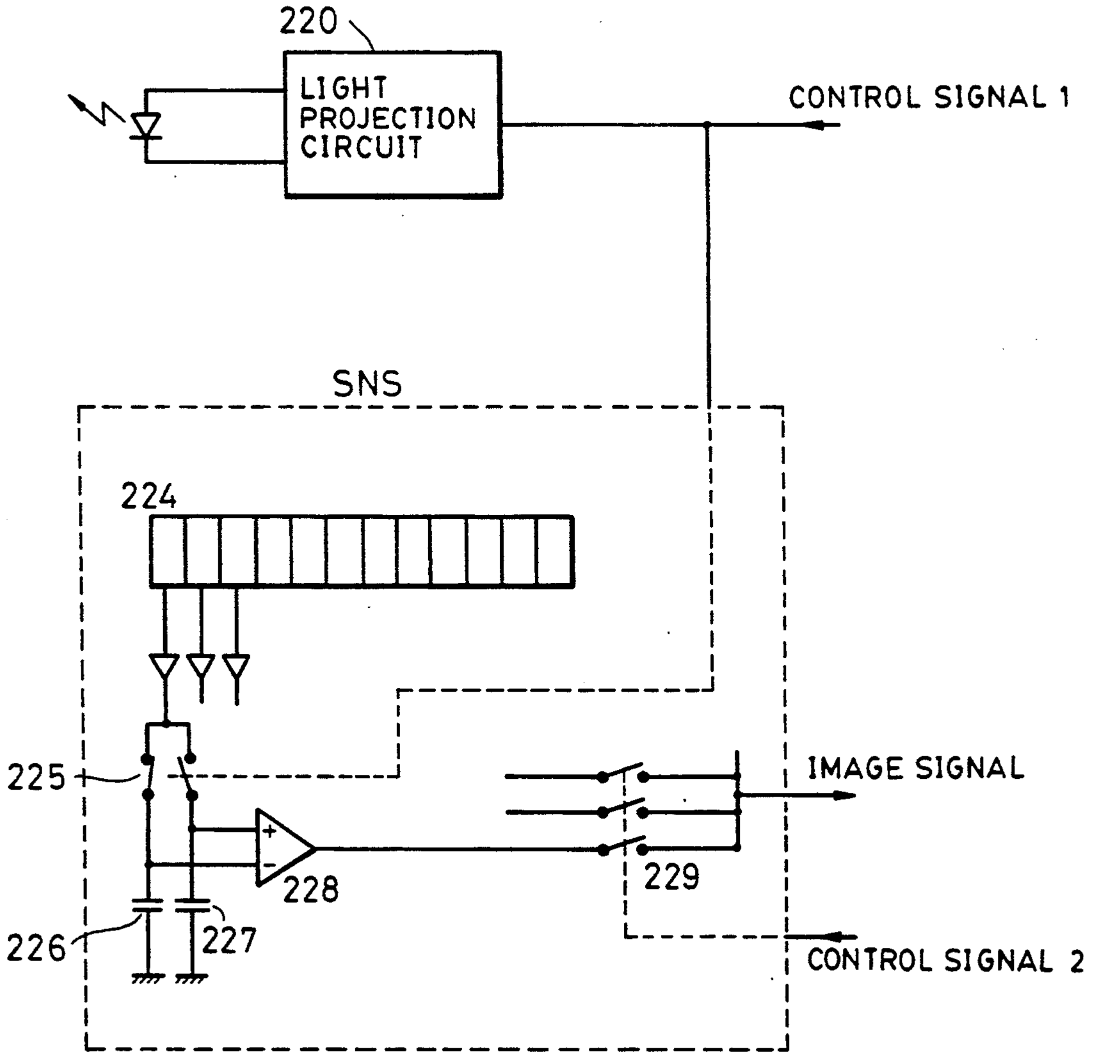
FIG. 7 is a circuit diagram showing an outline of an apparatus previously proposed by the assignee of the present application.

The setting of the number of storage operations may also be performed using the storage time for the sensor before performing the control of the synchronized storage and the sensor output. When a series of focus detection operations are carried out before performing the control of synchronized storage, for example, as shown in FIG. 6, since the sensor output using only external light and the sensor output using emitted light have been obtained before entering the control of synchronized storage, it is possible to previously set the number of repetitions of the control of synchronized storage.

[Step 20] A normal focus detection using only external light is performed before performing the control of synchronized storage. Accordingly, storage in the sensor is performed without projecting light by the light projection means at this time. The storage time for the sensor and the output amplification factor at the moment of storage are stored in NINTT and NGAIN storage areas, respectively. The maximum value NMAX of the sensor output is also calculated.

[Step 21] A determination of whether or not focus detection is possible is performed by data obtained by a normal storage control. If the detection is possible, an AF operation (a known correlation operation) is performed. If the data obtained by a normal storage has low contrast or brightness, focus detection cannot be performed. Hence, the process branches to step 22.

[Step 22] If focus detection cannot be performed by normal storage control, storage is performed while emitting light from the light projection means. However, storage using projected light without removing external light (storage by a normal lamp) is performed at this time. The storage time for the sensor and the output amplification factor at the moment of storage are stored in LINTT and LGAIN storage areas, respectively. The maximum value LMAX of the sensor output is then calculated.

[Step 23] A determination of whether or not focus detection can be performed by the data obtained by the above-described storage using projected light is performed. If the detection is possible, an AF operation is performed. If external light is strong, the data obtained at the storage using projected light becomes low contrast, and focus detection cannot be performed. Hence, the process branches to step 24, where the control of synchronized storage is performed.

The control of synchronized storage is from step 24 to step 28.

[Step 24] The number of repeated synchronized storage operations, the storage time and amplification factor of the sensor output are calculated from the storage times for a normal storage and a storage using projected light, and the amplification factor. It is impossible to compare the sensor outputs at the normal storage operation at step 20 and the storage operation with projecting light at step 22 with each other as they are. However, since the sensor output is proportional to the brightness, storage time and amplification factor of the sensor, it is possible to perform comparison by normalizing the two output values (or one value may be adjusted to another value).

For example, the number TCNT of storage operations when the storage time (INTT) and amplification factor (GAIN) at the synchronized storage are set to values identical to the storage time and amplification factor when light is projected is obtained as follows:

$$INTT=LINTT,\ GAIN=LGAIN,\ LMAX'=LMAX$$

$$NMAX'=\{NMAX\div(NINTT\times NGAIN)\}\times(INTT\times GAIN)$$

$$TCNT=THL\div(LMAX-NMAX').$$

However, if the TCNT calculated as described above is larger than the maximum number of repetitions which has been set, the TCNT is set to the maximum number of repetions, and the INTT and GAIN are changed.

[Step 25] Initialization of variables and initialization of the sensor are performed.

[Step 26] The operation of the synchronized storage is performed. The sensor control is performed with and without projecting light using the storage time and amplification factor which have been set at step 24, and a difference between the two cases is calculated. The calculated value is added to the value so far obtained.

[Step 27] The counter CNT for the number of repetitions is counted, and the value of the counter is compared with the number TCNT of repetitions obtained at step 24. If the two values are equal, the process proceeds to step 28 . If not, the process returns to step 26.

[Step 28] Finally, the correction calculation of the data is performed.

[Step 29] It is determined whether or not distance measurement (focus detection) is possible using the data obtained by the control of synchronized storage.

The determination may be performed by, for example, comparing the maximum values of data obtained by the control of synchronized storage, or comparing the difference between the maximum value and the minimum value of data with a predetermined value. If distance measurement is possible, the process branches to AF, where the operation of focus detection is performed. If distance measurement is not possible, the process branches to NG, where focus detection with data obtained at the control of synchronized storage is not performed.

In the above-described FIG. 6 embodiment, since it is unnecessary to calculate the maximum value and the minimum value during the control of synchronized storage and only the number of repetitions may be counted, an effect identical to that of the FIG. 5 embodiment can be obtained.

According to the present embodiment, since the sensor output when the light is emitted from the projection means (LED) and the sensor output when it is not emitted are read and the difference between the two outputs is calculated by the CPU, it is possible to separate the effect of light projected by the light projection means and external light, and distance measurement can be performed with the light projected by the light projection means even when there exists external light, without using newly-provided processing means or particular sensors. Furthermore, although an example in which the operation of focus detection is performed has been shown in the present embodiment, the distance to the object may also be calculated.

The individual components shown in outline or designated by blocks in the Drawings are well known in the autofocus field, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An autofocus apparatus for use with a light projection device which projects light to an object intermittently, comprising:

a storage sensor which alternately receives light reflected from the object when the light is projected onto the object and when the light is not projected onto the object; and a processing circuit coupled to said storage sensor for (1) causing said storage sensor to perform a first signal storing operation when the light projection device projects light, (2) for causing said storage sensor to perform a second signal storing operation when the light projection device does not project light, (3) for causing said storage sensor to perform an initial signal storing operation for a time required for a signal storing state of said storage sensor to reach a predetermined value, (4) for causing said storage sensor to perform a subsequent signal storing operation for a time corresponding to the time for the initial signal storing operation, (5) for reading from said storage sensor (a) a first sensor output signal obtained in the first signal storing operation every time the first signal storing operation is completed, and (b) a second sensor output signal obtained in the second signal storing operation every time the second signal storing operation is completed, (6) for setting said storage sensor in an initial state every time an output signal is read from said storage sensor, to cause the sensor to receive light in the initial state, and (7) for calculating a difference between said first and second sensor signals and providing an output signal corresponding to said difference.

2. Apparatus according to claim 1 wherein said autofocus apparatus is incorporated in a camera.

3. Apparatus according to claim 1 wherein the storage sensor comprises a plurality of picture elements.

4. Apparatus according to claim 1 wherein said processing circuit includes an A/D conversion circuit for converting analog signals output from said sensor into digital signals.

5. An autofocus apparatus for use with a light projection device which projects light to an object intermittently, comprising:

a storage sensor which alternately receives light reflected from the object when the light is projected onto the object and when the light is not projected onto the object; and a processing circuit coupled to said storage sensor for (1) causing said storage sensor to perform a first signal storing operation when the light projection device projects light, (2) for causing said storage sensor to perform a second signal storing operation when the light projection device does not project light, (3) for reading from said storage sensor (a) a first sensor output signal obtained in the first signal storing operation every time the first signal storing operation is completed, and (b) a second sensor output signal obtained in the second signal storing operation every time the second signal storing operation is completed, (4) for resetting said storage sensor to an initialized state each time a sensor output is read from said storage sensor, to cause said storage sensor to receive light in the initialized state, (5) for calculating a difference between the first and second sensor output signals each time the first and second sensor output signals are read, (6) for providing difference signals corresponding to the calculated differences between the first and second sensor output signals, (7) for adding the provided difference signals, and (8) for focusing an optical system based on the added difference signals.

6. Apparatus according to claim 5 wherein said autofocus apparatus is incorporated in a camera.

7. Apparatus according to claim 5 wherein said processing circuit determines a number of addition operations carried out in the adding of the provided different signals.

8. Apparatus according to claim 5 wherein said processing circuit determines when a difference between a maximum difference signal and a minimum difference signal exceeds a predetermined threshold.

9. Apparatus according to claim 5 wherein the storage sensor comprises a plurality of picture elements.

10. Apparatus according to claim 5 wherein said processing circuit includes an A/D conversion circuit for converting analog signals output from said sensor into digital signals.

* * * * *

UNITED STATES PATENT AND TRADEMARK OFFICE
CERTIFICATE OF CORRECTION

PATENT NO. : 5,138,358

DATED : August 11, 1992

INVENTOR(S) : Keisuke Aoyama et al

It is certified that error appears in the above-identified patent and that said Letters Patent is hereby corrected as shown below:

On the title page: Item

[56] References Cited:

"Spyron" should read --Spyrou--.

COLUMN 1:

line 46, "discrimiated" should read --discriminated--.

UNITED STATES PATENT AND TRADEMARK OFFICE

CERTIFICATE OF CORRECTION

PATENT NO. : 5,138,358

DATED : August 11, 1992

INVENTOR(S) : Keisuke Aoyama et al

It is certified that error appears in the above-identified patent and that said Letters Patent is hereby corrected as shown below:

COLUMN 2:

line 13, "and" should be deleted.

COLUMN 5:

line 23, "AND" should read --and--.

COLUMN 8:

line 60, "repetions," should read --repetitions,--.

Signed and Sealed this

Fifth Day of October, 1993

Attest:

BRUCE LEHMAN

*Attesting Officer*

*Commissioner of Patents and Trademarks*